US012700323B2

(12) United States Patent
Güemes Jiménez et al.

(10) Patent No.: US 12,700,323 B2
(45) Date of Patent: Aug. 4, 2026

(54) REAL-TIME GENERATION OF UNIQUE IDENTIFIERS FOR FLIGHT OBJECTS

(71) Applicant: THE BOEING COMPANY, Arlington, VA (US)

(72) Inventors: Alejandro Güemes Jiménez, Getafe (ES); Andrés Muñoz Hernández, Madrid (ES); Pablo Costas, Majadahonda (ES); Javier Lopez Leones, Majadahonda (ES); Elisa Morales Tirado, Madrid (ES)

(73) Assignee: The Boeing Company, Arlington, VA (US)

( * ) Notice: Subject to any disclaimer, the term of this patent is extended or adjusted under 35 U.S.C. 154(b) by 87 days.

(21) Appl. No.: 18/677,715

(22) Filed: May 29, 2024

(65) Prior Publication Data

US 2025/0371987 A1 Dec. 4, 2025

(51) Int. Cl.
*G06F 17/00* (2019.01)
*G08G 5/22* (2025.01)
*G08G 5/56* (2025.01)

(52) U.S. Cl.
CPC ................. *G08G 5/56* (2025.01); *G08G 5/22* (2025.01)

(58) Field of Classification Search
CPC ............... G08G 5/56; G08G 5/22; G08G 5/26
See application file for complete search history.

(56) References Cited

U.S. PATENT DOCUMENTS 8,990,910 B2 * 3/2015 Kumar ................ H04L 61/4552 726/8
11,455,694 B2 * 9/2022 DiNunzio .............. G06Q 50/01
11,893,832 B1 * 2/2024 Mateer .................... G06Q 10/02
2003/0182327 A1 * 9/2003 Ramanujam .......... G06F 16/273
2020/0133955 A1 * 4/2020 Padmanabhan ....... H04L 9/3218
(Continued)

OTHER PUBLICATIONS

Zina Ben Miled et al., Global change master directory: object-oriented active asynchronous transaction management in a federated environment using data agents. In Proceedings of the 2001 ACM symposium on Applied computing. Ass. for Computing Machinery, 207-214, <https://doi.org/10.1145/372202.372324> (Year: 2001).*
(Continued)

*Primary Examiner* — Greta L Robinson
(74) *Attorney, Agent, or Firm* — Alleman Hall LLP

(57) ABSTRACT

The present disclosure provides a method comprising receiving, from a first data source, information for a flight object comprising a first set of fields and corresponding values that describe a first flight. The method further comprises retrieving global identifier record(s) from a database. Each global identifier record comprises a unique global identifier for a respective flight and a respective second set of fields and corresponding values of the database that describe the respective flight. The method further comprises calculating, based on a comparison of the first set with some or all of the respective second set(s), a respective confidence value for each pairing of the flight object with a respective one of the global identifier record(s). The method further comprises updating, when a calculated confidence value exceeds a threshold value, the global identifier record corresponding to the calculated confidence value using information from the first set.

20 Claims, 5 Drawing Sheets

(56) References Cited

U.S. PATENT DOCUMENTS

| | | | | |
|---|---|---|---|---|
| 2023/0221173 | A1 * | 7/2023 | Sidiropoulos | G08G 5/26<br>381/56 |
| 2024/0143601 | A1 * | 5/2024 | Blais-Morin | G06F 18/24133 |

OTHER PUBLICATIONS

Howard, K., "Fixm Engineering Considerations", Air Transportation Information Exchange Conference—(Featuring AIXM, WXXM and FIXM), Aug. 28, 2012-Aug. 31, 2012, NOAA Auditorium and Science Center, Silver Spring, Maryland, presented Aug. 29, 2012, 36 pages.

* cited by examiner 300 (205)

| | 310 | 315-1 | 315-2 | | 315-N | 320-1 (325) | 320-2 (325) | 320-3 (325) |
|---|---|---|---|---|---|---|---|---|
| | Global ID | Data Source Table 1 ID | Data Source Table 2 ID | ••• | Data Source Table N ID | Origin | Destination | Callsign |
| 305-1 (210) | a896b875-fba6-81ce-a84d-5a86f700a693 | 24acb60ee4f75946 | 985f0b1474b4 | | a6f36c6d | JFK | LAX | Dl123 |
| 305-2 (210) | 3adb4282-7c23-0dbf-cef1-8a47af8d841d | - | 0e6c16f7734f | | 4c8572bc | LHR | CDG | Ba456 |
| 305-3 (210) | 04c68061-de5f-7a24-9d7a-17c70489be1f | a73cf3f88ea781bf | - | | 5a4b1630 | SFO | ORD | Ua789 |
| 305-4 (210) | ddc37027-9316-c33e-25fd-b979b3b503d5 | - | a4cfa618dd2 | | - | HND | ICN | Nh234 |
| | ••• | | | | | | | |

FIG. 3

REAL-TIME GENERATION OF UNIQUE IDENTIFIERS FOR FLIGHT OBJECTS

FIELD

Aspects of the present disclosure relate to air traffic management, and more specifically, to techniques for generating and maintaining unique identifiers for managing flights.

BACKGROUND

Within an air traffic management network, several source entities generate data that tracks the progress of flights across their various phases, such as preparation, execution, and review. The data is typically shared with different partner entities (e.g., flight dispatchers, air traffic controllers (ATCs), ground services, passengers) to improve the operational efficiency and safety of the flights. Each of these source entities (and in some cases, the partner entities) may assign distinct identifiers to flights to be able to effectively distinguish and track interventions for the particular flights.

Although the data from different sources is shared, there are currently no industry standards for generating the identifiers or for linking with identifiers received from different sources. This situation can be problematic, for example in the case of an entity such as an airline, that receives data for flights from a number of different sources, e.g., Automatic Dependent Surveillance—Broadcast (ADS-B) data, satellite-based surveillance data, System Wide Information Management (SWIM) data generated by multiple Air Navigation Service Providers (ANSPs), and so forth.

Further, discrepancies can arise with the shared data, as different entities might have differing portions of the shared data, and in some cases might not have the most recent version of the shared data. For example, an airline can perform a "tail swap" for a flight, where another aircraft is substituted for the aircraft scheduled to perform the flight. Although the airline possesses the updated data, other entities (e.g., the ANSPs) might not possess the updated data as the flight has not yet been activated in their system, resulting in a suboptimal discrepancy.

SUMMARY

The present disclosure provides a method in one aspect, the method including: receiving, from a first data source, information for a flight object including a first set of fields and corresponding values that describes a first flight. The method further includes retrieving one or more global identifier records from a database. Each global identifier record includes a unique global identifier for a respective flight and a respective second set of fields and corresponding values of the database that describe the respective flight. The method further includes calculating, based on a comparison of the first set with some or all of the one or more respective second sets, a respective confidence value for each pairing of the flight object with a respective one of the one or more global identifier records. The method further includes updating, when a calculated confidence value exceeds a threshold value, the global identifier record corresponding to the calculated confidence value using information from the first set.

In one aspect, in combination with any example method above or below, the method further includes determining whether the information for the flight object was previously recorded in a first table of the database corresponding to the first data source, and when the information for the flight object was not previously recorded, recording the information for the flight object in the first table.

In one aspect, in combination with any example method above or below, the method further includes receiving, from a second data source, information for a second flight object corresponding to the first flight, recording information for the second flight object in a second table of the database corresponding to the second data source, and updating the global identifier record corresponding to the first flight using the information for the second flight object.

In one aspect, in combination with any example method above or below, calculating the respective confidence value for each pairing includes initializing the confidence value to an initial value, and comparing, for each field of a predefined plurality of fields, the corresponding values of the first set and of the respective second set for the field. Calculating the respective confidence value further includes updating the confidence value based on the comparisons.

In one aspect, in combination with any example method above or below, the method further includes determining, for at least one field of the predefined plurality of fields, one or both of the first set and the respective second set do not include a value for the field. The method further includes applying, for the at least one field, a predefined penalty factor to the confidence value.

In one aspect, in combination with any example method above or below, the predefined plurality of fields includes one or more alphanumeric fields, and comparing the corresponding values of the first set and of the respective second set includes determining a normalized Levenshtein distance of the corresponding values.

In one aspect, in combination with any example method above or below, the predefined plurality of fields includes one or more temporal fields, and comparing the corresponding values of the first set and of the respective second set includes applying a step-wise function to determine a likelihood of the corresponding values being associated with a same event.

The present disclosure provides a computer program product in one aspect, the computer program product includes a computer-readable storage medium having computer-readable program code embodied therewith. The computer-readable program code is executable by one or more computer processors to perform an operation that includes receiving, from a first data source, information for a flight object including a first set of fields and corresponding values that describe a first flight. The operation further includes retrieving one or more global identifier records from a database. Each global identifier record includes a unique global identifier for a respective flight and a respective second set of fields and corresponding values of the database that describe the respective flight. The operation further includes calculating, based on a comparison of the first set with some or all of the one or more respective second sets, a respective confidence value for each pairing of the flight object with a respective one of the one or more global identifier records. The operation further includes updating, when a calculated confidence value exceeds a threshold value, the global identifier record corresponding to the calculated confidence value using information from the first set.

In one aspect, in combination with any example computer program product above or below, the operation further includes determining whether the information for the flight object was previously recorded in a first table of the database corresponding to the first data source, and when the information for the flight object was not previously recorded, recording the information for the flight object in the first table.

In one aspect, in combination with any example computer program product above or below, the operation further includes receiving, from a second data source, information for a second flight object corresponding to the first flight. The operation further includes recording information for the second flight object in a second table of the database corresponding to the second data source. The operation further includes updating the global identifier record corresponding to the first flight using the information for the second flight object.

In one aspect, in combination with any example computer program product above or below, calculating the respective confidence value for each pairing includes initializing the confidence value to an initial value, and comparing, for each field of a predefined plurality of fields, the corresponding values of the first set and of the respective second set for the field. Calculating the respective confidence value further includes updating the confidence value based on the comparisons.

In one aspect, in combination with any example computer program product above or below, the operation further includes determining, for at least one field of the predefined plurality of fields, one or both of the first set and the respective second set do not include a value for the field. The operation further includes applying, for the at least one field, a predefined penalty factor to the confidence value.

In one aspect, in combination with any example computer program product above or below, the predefined plurality of fields includes one or more alphanumeric fields, and comparing the corresponding values of the first set and of the respective second set includes determining a normalized Levenshtein distance of the corresponding values.

In one aspect, in combination with any example computer program product above or below, the predefined plurality of fields includes one or more temporal fields, and comparing the corresponding values of the first set and of the respective second set includes applying a step-wise function to determine a likelihood of the corresponding values being associated with a same event.

The present disclosure provides a system in one aspect, the system including: one or more processors, and a memory storing instructions that when executed by the one or more processors enable performance of an operation. The operation includes receiving, from a first data source, information for a flight object including a first set of fields and corresponding values that describe a first flight. The operation further includes retrieving one or more global identifier records from a database. Each global identifier record includes a unique global identifier for a respective flight and a respective second set of fields and corresponding values of the database that describe the respective flight. The operation further includes calculating, based on a comparison of the first set with some or all of the one or more respective second sets, a respective confidence value for each pairing of the flight object with a respective one of the one or more global identifier records. The operation further includes updating, when a calculated confidence value exceeds a threshold value, the global identifier record corresponding to the calculated confidence value using information from the first set.

In one aspect, in combination with any example system above or below, the operation further includes determining whether the information for the flight object was previously recorded in a first table of the database corresponding to the first data source, and when the information for the flight object was not previously recorded, recording the information for the flight object in the first table.

In one aspect, in combination with any example system above or below, the operation further includes receiving, from a second data source, information for a second flight object corresponding to the first flight. The operation further includes recording information for the second flight object in a second table of the database corresponding to the second data source, and updating the global identifier record corresponding to the first flight using the information for the second flight object.

In one aspect, in combination with any example system above or below, calculating the respective confidence value for each pairing includes initializing the confidence value to an initial value, and comparing, for each field of a predefined plurality of fields, the corresponding values of the first set and of the respective second set for the field. Calculating the respective confidence value further includes updating the confidence value based on the comparisons.

In one aspect, in combination with any example system above or below, the operation further includes determining, for at least one field of the predefined plurality of fields, one or both of the first set and the respective second set do not include a value for the field. The operation further includes applying, for the at least one field, a predefined penalty factor to the confidence value.

In one aspect, in combination with any example system above or below, the predefined plurality of fields includes one or more alphanumeric fields and one or more temporal fields, and comparing the corresponding values of the first set and of the respective second set includes determining a normalized Levenshtein distance of the corresponding values for the one or more alphanumeric fields. Comparing the corresponding values of the first set and of the respective second set includes applying a step-wise function to determining a likelihood of the corresponding values being associated with a same event for the one or more temporal fields.

BRIEF DESCRIPTION OF THE DRAWINGS

So that the manner in which the above-recited features can be understood in detail, a more particular description, briefly summarized above, may be had by reference to example aspects, some of which are illustrated in the appended drawings.

FIG. 3 is an exemplary global identifier table, according to one or more aspects.

DETAILED DESCRIPTION

The present disclosure describes techniques, and an air traffic management system, for identifying the same flight across different sources and generating a unique global identifier for the flight. In various aspects, the system is capable of managing different types of sources and their respective data such as satellite-based surveillance data, SWIM data, fleet management information, and so forth. The system is further capable of addressing discrepancies in the data characterizing a flight and its availability, providing a confidence value in the matching of different data sources.

The system is capable of consuming data from the various sources in real-time. In some aspects, a flight object from a source is received by the system, and the system determines whether information from the flight object was previously recorded in a database. The system may record the information in the database if the information has not been previously recorded. If the information had been previously recorded, the system may further assess the information to determine any discrepancies affecting the identification or characterization of the flight.

The data from the various sources is stored in the database. As the database stores the most up-to-date version of the data for the associated flights, in some aspects clients may access the database through an API service. In this way, the clients may operate more efficiently, as they do not need to constantly process real-time feeds but instead may simply request the desired data.

In some aspects, the system receives a flight object comprising a first set of fields, and comparing the first set of fields with second set(s) of fields stored in global identifier record(s). The system calculates confidence value(s) for pairing(s) of the flight object with individual global identifier record(s). When a confidence value exceeds a threshold value, the system treats the flight object as matching an existing global identifier record, and the global identifier record is updated using information from the first set.

Figure 1:
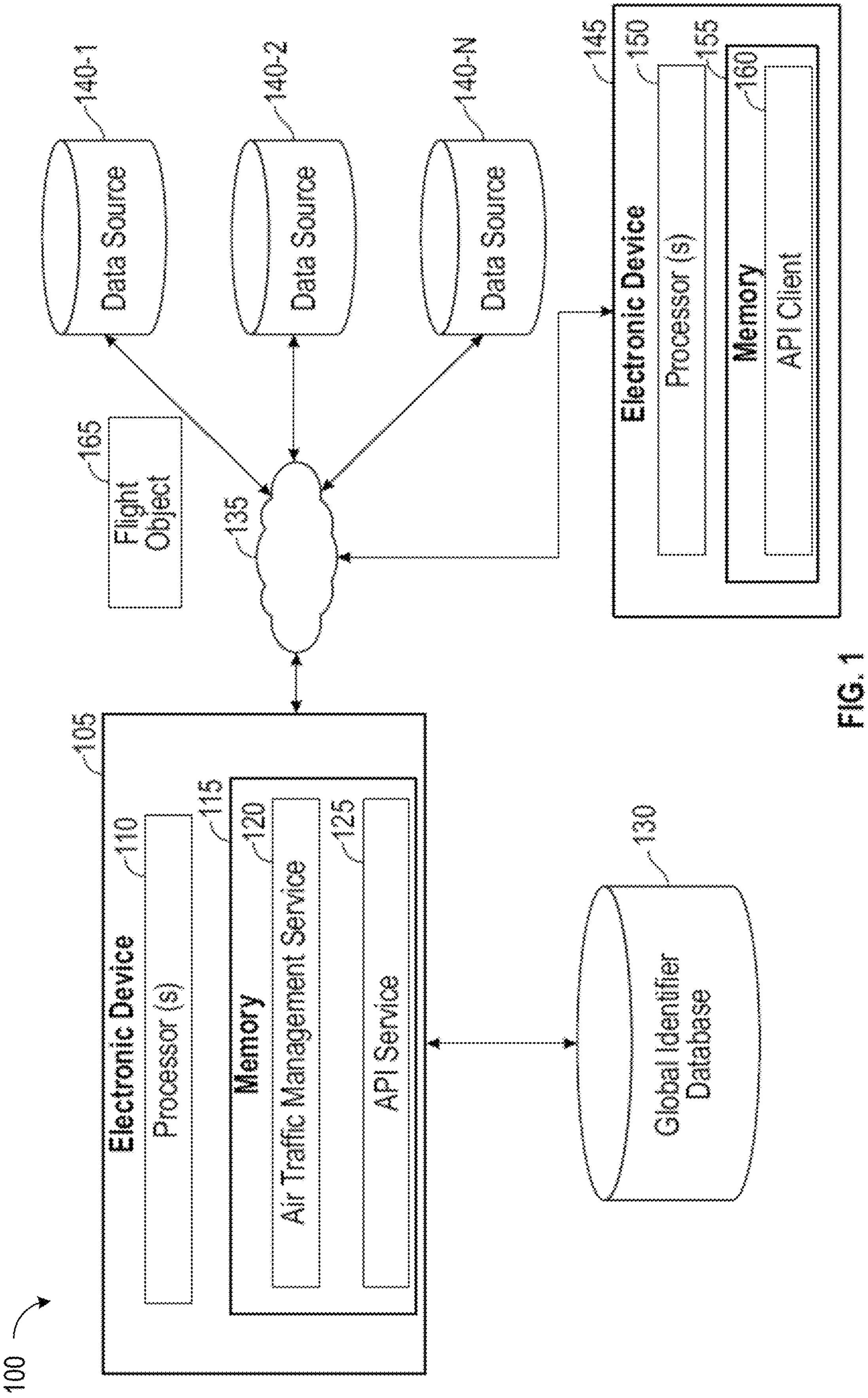
FIG. 1 is a diagram of an exemplary air traffic management system, according to one or more aspects.

FIG. 1 is a diagram of an exemplary air traffic management system 100 (hereinafter "system 100"), according to one or more aspects. Various features of the system 100 may be used in conjunction with other aspects.

The system 100 comprises an electronic device 105 that is communicatively coupled with a plurality of data sources 140-1, 140-2, . . . , 140-N through a network 135. As used herein, an "electronic device" generally refers to any device having electronic circuitry that provides a processing or computing capability, and that implements logic and/or executes program code to perform various operations that collectively define the functionality of the electronic device. The functionality of the electronic device includes a communicative capability with one or more other electronic devices, e.g., when connected to a same network. An electronic device may be implemented with any suitable form factor, whether relatively static in nature (e.g., mainframe, computer terminal, server, kiosk, workstation) or mobile (e.g., laptop computer, tablet, handheld, smart phone, wearable device). The communicative capability between electronic devices may be achieved using any of a number of suitable techniques, such as conductive cabling, wireless transmission, optical transmission, and so forth. Further, although described as being performed by a single electronic device, in other aspects, the functionalities of the system 100 may be performed by a plurality of electronic devices.

The electronic device 105 comprises one or more processors 110 and a memory 115. The one or more processors 110 are any electronic circuitry, including, but not limited to, one or a combination of microprocessors, microcontrollers, application-specific integrated circuits (ASIC), application-specific instruction set processors (ASIP), and/or state machines, that is/are communicatively coupled to the memory 115 and control(s) the operation of the electronic device 105. The one or more processors 110 are not limited to a single processing device and may encompass multiple processing devices.

The one or more processors 110 may include other hardware that operates software to control and process information. In some aspects, the one or more processors 110 execute software stored in the memory 115 to perform any of the functions described herein. The one or more processors 110 control the operation and administration of the electronic device 105 by processing information (e.g., information received from input devices and/or communicatively coupled electronic devices).

The memory 115 may store, either permanently or temporarily, data, operational software, or other information for the one or more processors 110. The memory 115 may include any one or a combination of volatile or non-volatile local or remote devices suitable for storing information. For example, the memory 115 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 115, a disk, a CD, or a flash drive. In particular embodiments, the software may include an application executable by the one or more processors 160 to perform the functionality described herein (e.g., an air traffic management service 120 and an API service 125, discussed below).

In this example, the memory 115 stores the air traffic management service 120 that receives information from the plurality of data sources 140-1, 140-2, . . . , 140-N through the network 135. The network 135 may have any suitable implementation, such as one or more wide area networks (WANs), one or more local access networks (LANs), or combinations thereof. The network 135 comprises infrastructure for communicative capability, such as conductive cabling, wireless transmission, optical transmission, and so forth. The network 135 may further comprise one or more electronic devices providing network functionality and/or services to the network 135, such as routers, firewalls, switches, gateway computers, edge servers, and so forth.

The plurality of data sources 140-1, 140-2, . . . , 140-N may have any suitable implementation. Generally, each of the plurality of data sources 140-1, 140-2, . . . , 140-N may be implemented as a respective one or more electronic devices, such as servers. In some aspects, one or more of the plurality of data sources 140-1, 140-2, . . . , 140-N provides database storage and a database management system.

The plurality of data sources 140-1, 140-2, . . . , 140-N may be operated by different entities. In some aspects, the plurality of data sources 140-1, 140-2, . . . , 140-N includes one or more ATC systems providing real-time data on flight paths, altitude, speed, and weather conditions. In some aspects, the plurality of data sources 140-1, 140-2, . . . , 140-N includes one or more flight tracking systems that use radar, satellite, ADS-B, etc. to provide real-time data on flight positions, speeds, headings, and altitude. In some aspects, the plurality of data sources 140-1, 140-2, . . . , 140-N includes one or more aviation messaging systems providing real-time messages related to flight plans, clearances, notices to airmen (NOTAMs), and other operational information. In some aspects, the plurality of data sources 140-1, 140-2, . . . , 140-N includes one or more Air Navigation Service Providers (ANSPs) that provide System Wide Information Management (SWIM) data for transoceanic flights. Other types of data sources are also contemplated.

The information communicated to the air traffic management service 120 by the plurality of data sources 140-1, 140-2, . . . , 140-N may have any suitable formatting. In some aspects, the plurality of data sources 140-1, 140-2, . . . , 140-N communicate the information as flight objects 165 representing discrete units that comprise structured or semi-structured data. In some aspects, each of the flight objects 165 comprises a plurality of fields and corresponding values for the fields. In some alternate aspects, some or all of the flight objects 165 comprise freeform text (e.g., within semi-structured or unstructured data), and the air traffic management service 120 performs processing on the freeform text to identify and extract field(s) and corresponding value(s) from the freeform text. Notably, the fields stored in the various flight objects 165 may defined by the data sources 140-1, 140-2, . . . , 140-N, such that a flight object 165 received from one data source 140-1 need not share a same format as a flight object 165 received from another data source 140-2.

The air traffic management service 120 maintains information related to the flights in a global identifier database 130. In some aspects, the air traffic management service 120 processes the information received from the plurality of data sources 140-1, 140-2, . . . , 140-N and updates the global identifier database 130 using the processed information. In some aspects, the air traffic management service 120 filters the flight objects 165, such that only a portion of the information that is contained in the flight objects 165 is stored in the global identifier database 130. For example, the air traffic management service 120 may extract information corresponding to one or more of a predefined plurality of fields, which may include one or more alphanumeric fields and/or one or more temporal fields. In some alternate aspects, the air traffic management service 120 stores all of the information from the flight objects 165 in the global identifier database 130.

The global identifier database 130 may have any suitable implementation. In some aspects, the global identifier database 130 is integrated with the electronic device 105 (e.g., within one or more storage devices). In other aspects, the global identifier database 130 is implemented separate from the electronic device 105 (e.g., as one or more servers connected with the electronic device 105 through the network 135).

In some aspects, the air traffic management service 120 assigns a global identifier to each distinct flight, and associates the global identifier with one or more (local) identifiers that have been provided to the flight by various ones of the data sources 140-1, 140-2, . . . , 140-N. Further discussion of the global identifiers is provided below with respect to FIG. 2.

As information is received through the network 135 (e.g., receiving messages with flight objects 165 from various data sources 140-1, 140-2, . . . , 140-N), the air traffic management service 120 determines whether the information corresponds to a flight that has already been assigned a global identifier in the global identifier database 130, or whether a new global identifier should be assigned. Where the information corresponds to a flight but includes one or more discrepancies with the information stored in the global identifier database 130, the air traffic management service 120 determines whether to update the global identifier database 130 with the new information.

During operation of the system 100, information received in real-time from the plurality of data sources 140-1, 140-2, . . . , 140-N is stored in the global identifier database 130. As the global identifier database 130 represents the most up-to-date version of the information for the various flights, in some aspects the system 100 may be configured to provide clients with access to the global identifier database 130. Various types of clients may benefit from the updated version of the information provided by the global identifier database 130. Some examples of the clients include flight dispatching systems, ATC systems, Airport Operational Database (AODB) systems, Maintenance, Repair, and Overhaul (MRO) systems, passengers service systems, airline reservation systems, and so forth. Access to the global identifier database 130 allows the clients to operate more efficiently, as the clients do not need to actively monitor the network 135 for the various flight objects 165 transmitted by the plurality of data sources 140-1, 140-2, . . . , 140-N. Instead, the clients may simply request the desired information, e.g., submitting queries by specifying values for one or more fields stored by the global identifier database 130 (some examples are discussed below).

In some aspects, the system 100 further comprises an electronic device 145 comprising one or more processors 150 and a memory 155. The electronic device 145 represents a client device and may be provided in any suitable form. The one or more processors 150 may be similar to the one or more processors 110, and the memory 155 may be similar to the memory 115 discussed above.

The memory 115 of the electronic device 105 may comprise the API service 125, and the memory 155 of the electronic device 125 may comprise an API client 160. The API client 160 may be provided in any suitable form, such as a standalone application operating on the electronic device 145, a plug-in to an application, or a web browser-based interface. In some aspects, the plurality of data sources 140-1, 140-2, . . . , 140-N are operated by different entities, and the API service 125 defines a plurality of processes, each corresponding to one of the different entities.

The API client 160 transmits a request (query) to the API service 125 via the network 135, which may specify the requested information, parameters, authentication credentials, and so forth. In some aspects, the parameters include values for one or more fields such as an Airline, an Aerodrome of Departure, an Aerodrome of Destination, a Flight Callsign, a Network Manager identifier, an FAA identifier, the global identifier, and so forth. The API service 125 processes the request, retrieves the requested information from the global identifier database 130, and transmits a response to the API client 160 with the requested information.

Figure 2:
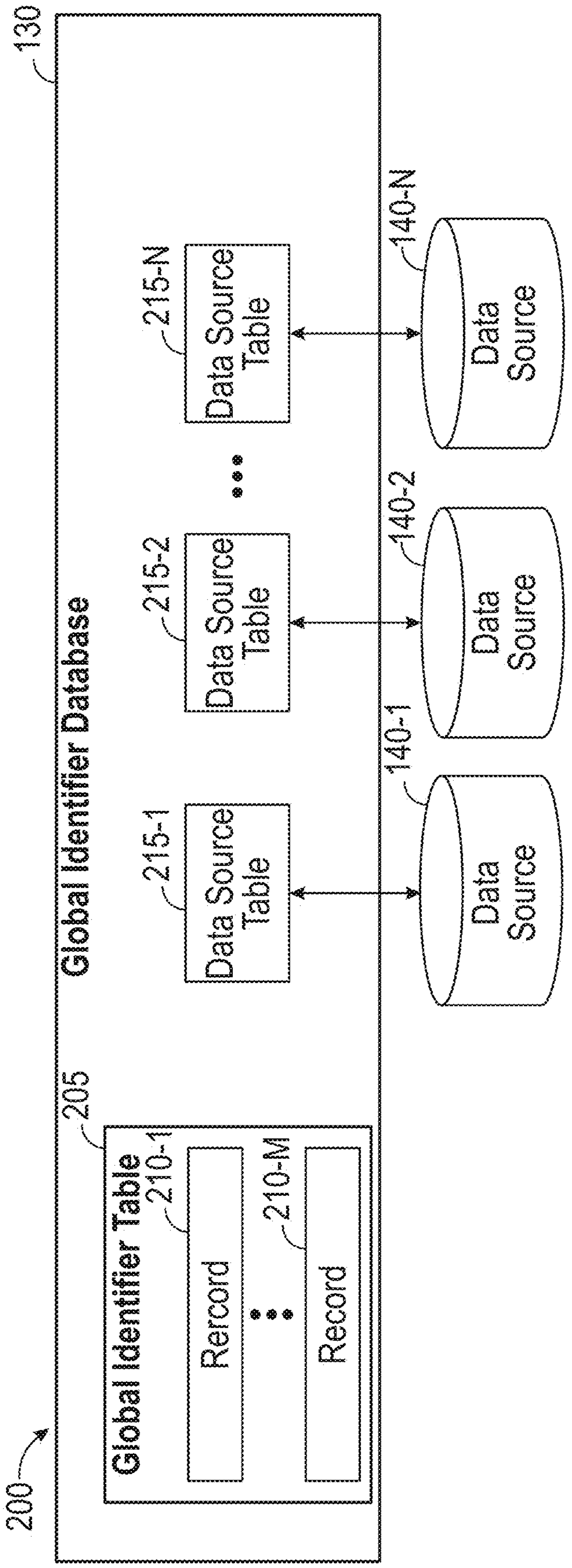
FIG. 2 is a diagram of an exemplary global identifier database, according to one or more aspects.

FIG. 2 is a diagram 200 of an exemplary global identifier database, according to one or more aspects. Various features of the diagram 200 may be used in conjunction with other aspects. For example, the global identifier database 130 depicted in the diagram 200 may be implemented within the system 100 of FIG. 1.

The global identifier database 130 comprises a global identifier table 205 comprising a plurality of global identifier records (also referred to as "records") 210-1, . . . , 210-M. The global identifier database 130 further comprises one or more other tables that store some or all of the information received from the plurality of data sources 140-1, 140-2, . . . , 140-N. In some aspects, the global identifier database 130 comprises a plurality of data source tables 215-1, 215-2, . . . , 215-N, where each data source table

215-1, 215-2, . . . , 215-N corresponds to a respective data source 140-1, 140-2, . . . , 140-N. Other configurations are also contemplated, such as a single table that stores information received from the plurality of data sources 140-1, 140-2, . . . , 140-N.

As discussed above, some or all of the information contained in the flight objects 165 is stored in the global identifier database 130. In some aspects, the global identifier database 130 stores information corresponding to a predefined plurality of fields. In some aspects, the predefined plurality of fields includes one or more alphanumeric fields and/or one or more temporal fields. In one example implementation of the global identifier database 130, the predefined plurality of fields comprises a plurality of alphanumeric fields: an origin, a destination, and a callsign of the flight. In another example implementation, the predefined plurality of fields further includes additional alphanumeric fields: an airline, a registration, an aircraft type, and a transponder address of the flight, and still further includes one temporal field: an estimated off-block time (EOBT) of the flight. Other implementations having different compositions or combinations of the predefined plurality of fields are also contemplated.

FIG. 3 is an exemplary global identifier table 300, according to one or more aspects. Various features of the global identifier table 300 may be used in conjunction with other aspects. For example, the global identifier table 300 represents one example implementation of the global identifier table 205 of FIG. 2.

The global identifier table 300 comprises a plurality of global identifier records 305-1, 305-2, 305-3, 305-4, each of which represents one example of a global identifier record 210 (e.g., global identifier records 210-1, . . . , 210-M of FIG. 2). Although four global identifier records 305-1, 305-2, 305-3, 305-4 are shown, the global identifier table 300 may include any other number of global identifier records (e.g., 1-3, 5 or more). In some aspects, each of the global identifier records 305-1, 305-2, 305-3, 305-4 comprises a plurality of fields and one or more corresponding values. As shown, each of the global identifier records 305-1, 305-2, 305-3, 305-4 comprises a global identifier field 310 that is assigned to the flight, and a plurality of identifier fields 315-1, 315-2, . . . , 315-N for the flight that correspond to the plurality of data source tables. The global identifier records 305-1, 305-2, 305-3, 305-4 may include additional fields and values related to the flight. In some aspects, the global identifier records 305-1, 305-2, 305-3, 305-4 further comprises a respective second set 325 of fields and corresponding values that describe the respective flight. As shown, the respective second set 325 of fields and corresponding values comprise an origin field 320-1, a destination field 320-2, and a callsign field 320-3. Other numbers and/or types of fields are also contemplated, which may encompass other alphanumeric fields (e.g., an airline, a registration, an aircraft type, and a transponder address of the flight) and/or temporal fields (e.g., an EOBT of the flight).

In some aspects, the respective second set 325 includes fewer fields (that is, the origin field 320-1, the destination field 320-2, and the callsign field 320-3) than the fields included in the flight objects received from the various data sources 140-1, 140-2, . . . , 140-N. Stated another way, the global identifier records 305-1, 305-2, 305-3, 305-4 may store information from selected fields of the flight objects, such that less than all of the information included in the flight objects is written into the respective second set 325. In some aspects, the fields of the respective second set 325 correspond to a predefined plurality of fields that are used for comparisons with fields of a received flight object to calculate confidence values, discussed in greater detail below.

The global identifier records 305-1, 305-2, 305-3, 305-4 need not include values for each of the plurality of identifier fields 315-1, 315-2, . . . , 315-N or for each of the fields of the respective second set. As shown, the global identifier record 305-1 comprises values for each of the plurality of identifier fields 315-1, 315-2, . . . , 315-N, the global identifier record 305-2 omits a value for the identifier field 315-1, the global identifier record 305-3 omits a value for the identifier field 315-2, and the global identifier record 305-4 omits values for the identifier fields 315-1, 315-N.

The values of the global identifier field 310 and the plurality of identifier fields 315-1, 315-2, . . . , 315-N may have any suitable formatting. In some aspects, the values of the global identifier field 310 comply with the Universally Unique Identifier (UUID) Uniform Resource Name namespace, where each value is a 128-bit label that may be represented in different formats. The values of the global identifier field 310 are shown in FIG. 3 as 32 hexadecimal characters (corresponding to 128 bits) in an 8-4-4-4-12 format, e.g., a896b875-fba6-81ce-a84d-5a86f700a693. Alternate formats for values of the global identifier field 310 that are capable of uniquely identifying the flights are also contemplated.

The formatting used for values of the plurality of identifier fields 315-1, 315-2, . . . 315-N may be internally specified by the corresponding data sources 140-1, 140-2, . . . , 140-N. While the values for the plurality of identifier fields 315-1, 315-2, . . . , 315-N are likely capable of uniquely identifying the flights within the respective data sources 140-1, 140-2, . . . , 140-N, the values might or might not be capable of uniquely identifying all of the flights that are represented in the global identifier table 300. The values of the identifier fields 315-1, 315-2, . . . , 315-N are shown as 16, 12, and 8 hexadecimal characters, respectively. These formats were selected to illustrate differences between the global identifier field 310 and the plurality of identifier fields 315-1, 315-2, . . . , 315-N, but any suitable alternate formats are also contemplated. Although not shown, in some aspects, the air traffic management service 120 may generate values for the global identifier field 310 based on value(s) of one or more of the plurality of identifier fields 315-1, 315-2, . . . , 315-N, e.g., concatenating value(s) of the identifier field(s) 315-1, 315-2, . . . , 315-N with other characters, generating a hash value using value(s) of the identifier field(s) 315-1, 315-2, . . . , 315-N, and so forth.

In some aspects, the air traffic management service 120 accesses the global identifier table 300 responsive to receiving a new flight object. As will be discussed in greater detail below, the air traffic management service 120 may reference a particular flight (e.g., a particular record 305-1, 305-2, 305-3, 305-4) using an identifier of the flight object (e.g., a value of the global identifier field 310 or of one of the plurality of identifier fields 315-1, 315-2, . . . , 315-N), The air traffic management service 120 may update the information in different data source tables 215-1, 215-2, . . . , 215-N using information included in the flight object.

Figure 4:
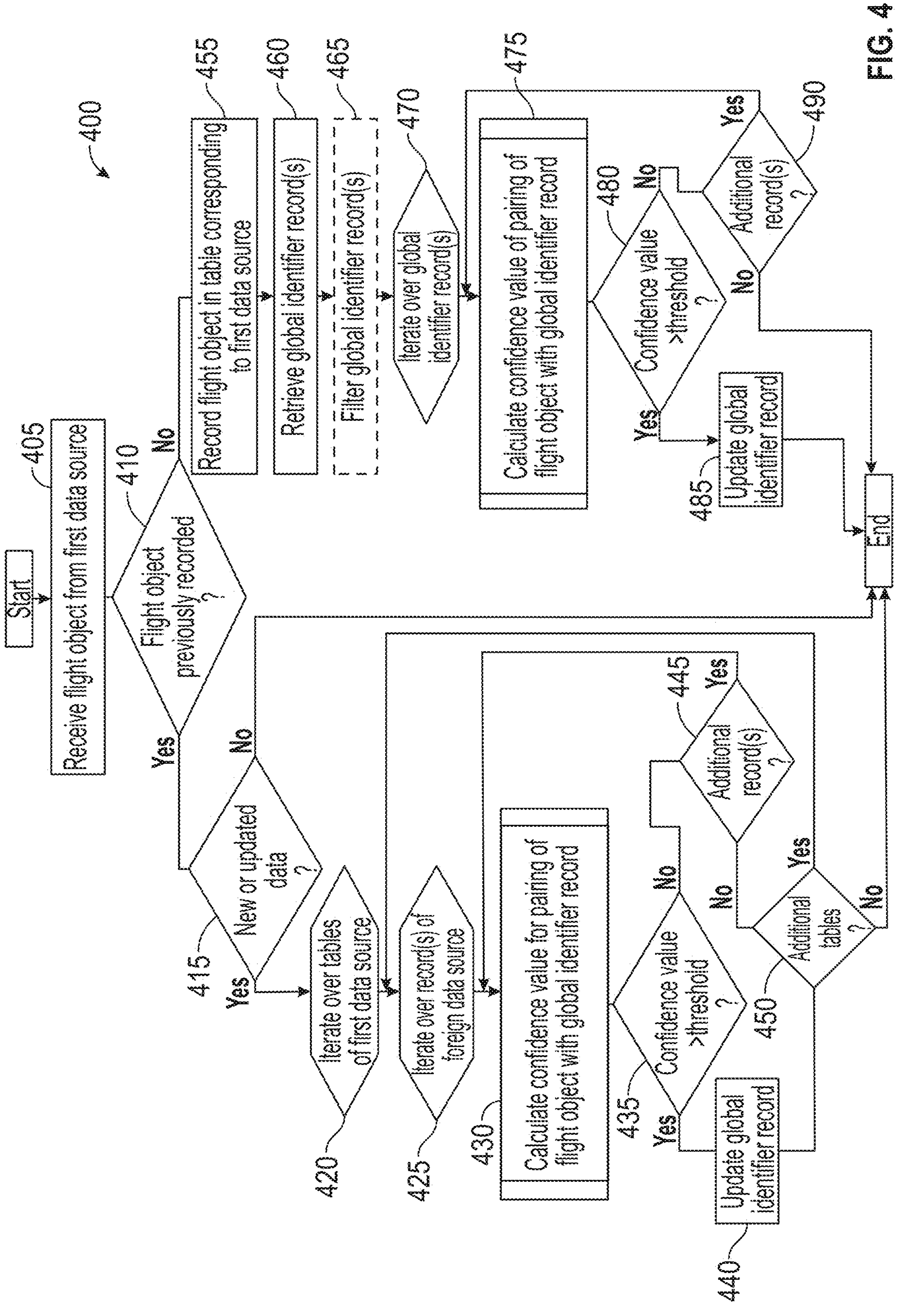
FIG. 4 is an exemplary method of updating a global identifier record using a received flight object, according to one or more aspects.

FIG. 4 is an exemplary method 400 of updating a global identifier record using a received flight object, according to one or more aspects. The method 400 may be used in conjunction with other aspects, for example, performed using the air traffic management service 120 of FIG. 1.

The method 400 begins at block 405, where the air traffic management service 120 receives a flight object from a first data source. In some aspects, the flight object includes structured, semi-structured, and/or freeform data that identifies and/or characterizes the flight. In some aspects, the first data source is one of an ATC system, a flight tracking system, an aviation messaging system, and an ANSP system.

At block 410, the air traffic management service 120 determines whether information from the flight object has been previously recorded. In some aspects, determining whether the information has been previously recorded comprises comparing an identifier of the flight object with other identifiers of flight objects that are stored in a database. In some aspects, the identifier of the flight object is assigned to flight object by the first data source. In some aspects, the database comprises a plurality of tables corresponding to a plurality of data sources, and the identifier of the flight object is compared with other identifiers that are stored in the table corresponding to the first data source.

When the flight object has been previously recorded ("YES"), the method 400 proceeds to block 415, where the air traffic management service 120 determines whether the flight object includes new or updated data. In some aspects, determining whether the flight object includes new or updated data comprises comparing values of fields of the flight object with information stored in the table corresponding to the first data source. Other techniques for determining whether the flight object includes new or updated data are also contemplated, such as receiving an indication from the data source (e.g., a flag that is set when the flight record is updated). When the flight object does not include new or updated data ("NO"), the method 400 ends.

However, when the flight object includes new or updated data ("YES"), the method 400 proceeds to block 420, where the air traffic management service 120 iterates over tables of the first data source (e.g., an outer loop), and at block 425, the air traffic management service 120 iterates over one or more records of the foreign data source (e.g., an inner loop).

At block 430, the air traffic management service 120 calculates a confidence value for the pairing of the flight object with a global identifier record. In some aspects, the confidence value is calculated based on a comparison of values for the same fields of the flight object with the information in the database (e.g., within the data source table that is addressed by the global identifier record). One example of calculating the confidence value is discussed below with respect to FIG. 5, but other techniques for calculating the confidence value for the pairing are also contemplated. At block 435, the air traffic management service 120 determines whether the confidence value is greater than a threshold value. The threshold value may be set to any suitable value, e.g., 0.70 on a 0-1 scale (the unit interval).

When the confidence value is greater than the threshold value ("YES"), the air traffic management service 120 effectively deems that the flight object matches the global identifier record. The method 400 proceeds from block 435 to block 440, and the air traffic management service 120 updates the global identifier record with information from the flight object. In some aspects, the air traffic management service 120 extracts only the new or updated information corresponding to a predefined plurality of fields. The method 400 proceeds from block 440 to block 450, discussed below.

When the confidence value is not greater than the threshold value ("NO"), the method 400 proceeds from block 435 to block 445 and the air traffic management service 120 determines whether there are any additional records to iterate through. When there are additional records ("YES"), the method 400 returns from block 445 to block 430. When there are not any additional records ("NO"), the method 400 proceeds from block 445 to block 450. Whether coming from block 440 or 445, at block 450 the air traffic management service 120 determines whether there are any additional tables to iterate through. When there are additional tables ("YES"), the method 400 returns from block 450 to block 425. When there are not any additional records ("NO"), the method 400 ends.

Returning to the block 410, when the flight object has not been previously recorded ("NO"), the method 400 proceeds to block 455, where the air traffic management service 120 records the flight object in a table corresponding to the first data source. In some aspects, the air traffic management service 120 extracts only information corresponding to a predefined plurality of fields.

At block 460, the air traffic management service 120 retrieves one or more global identifier records. At optional block 465, the air traffic management service 120 filters the one or more global identifier records. In some aspects, the air traffic management service 120 iterates over the retrieved one or more global identifier records and, if more than one pairing has a confidence value exceeding the threshold value, selects the pairing with the greatest confidence value.

At block 470, the air traffic management service 120 iterates over the (filtered) one or more global identifier records. At block 475, the air traffic management service 120 calculates a confidence value for the pairing of the flight object with a global identifier record. In some aspects, the confidence value is calculated based on a comparison of values for the same fields of the flight object with the information in the database (e.g., within the data source table that is addressed by the global identifier record). One example of calculating the confidence value is discussed below with respect to FIG. 5, but other techniques for calculating the confidence value for the pairing are also contemplated. At block 480, the air traffic management service 120 determines whether the confidence value is greater than a threshold value. The threshold value may be set to any suitable value, e.g., 0.70 on a 0-1 scale. The threshold value may be determined according to any suitable techniques. In one example, different threshold values may be applied for different conditions (e.g., the threshold value used in block 435 may be different than the threshold value used in block 480).

When the confidence value is greater than the threshold value ("YES"), the air traffic management service 120 effectively deems that the flight object matches the global identifier record. The method 400 proceeds from block 480 to block 485, and the air traffic management service 120 updates the global identifier record with information from the flight object. In some aspects, the air traffic management service 120 extracts only the new or updated information corresponding to a predefined plurality of fields. The method 400 ends following completion of block 485.

When the confidence value is not greater than the threshold value ("NO"), the method 400 proceeds from block 480 to block 490 and the air traffic management service 120 determines whether there are any additional records to iterate through. When there are additional records ("YES"), the method 400 returns from block 490 to block 475. When there are not additional records ("NO"), the method 400 ends.

Figure 5:
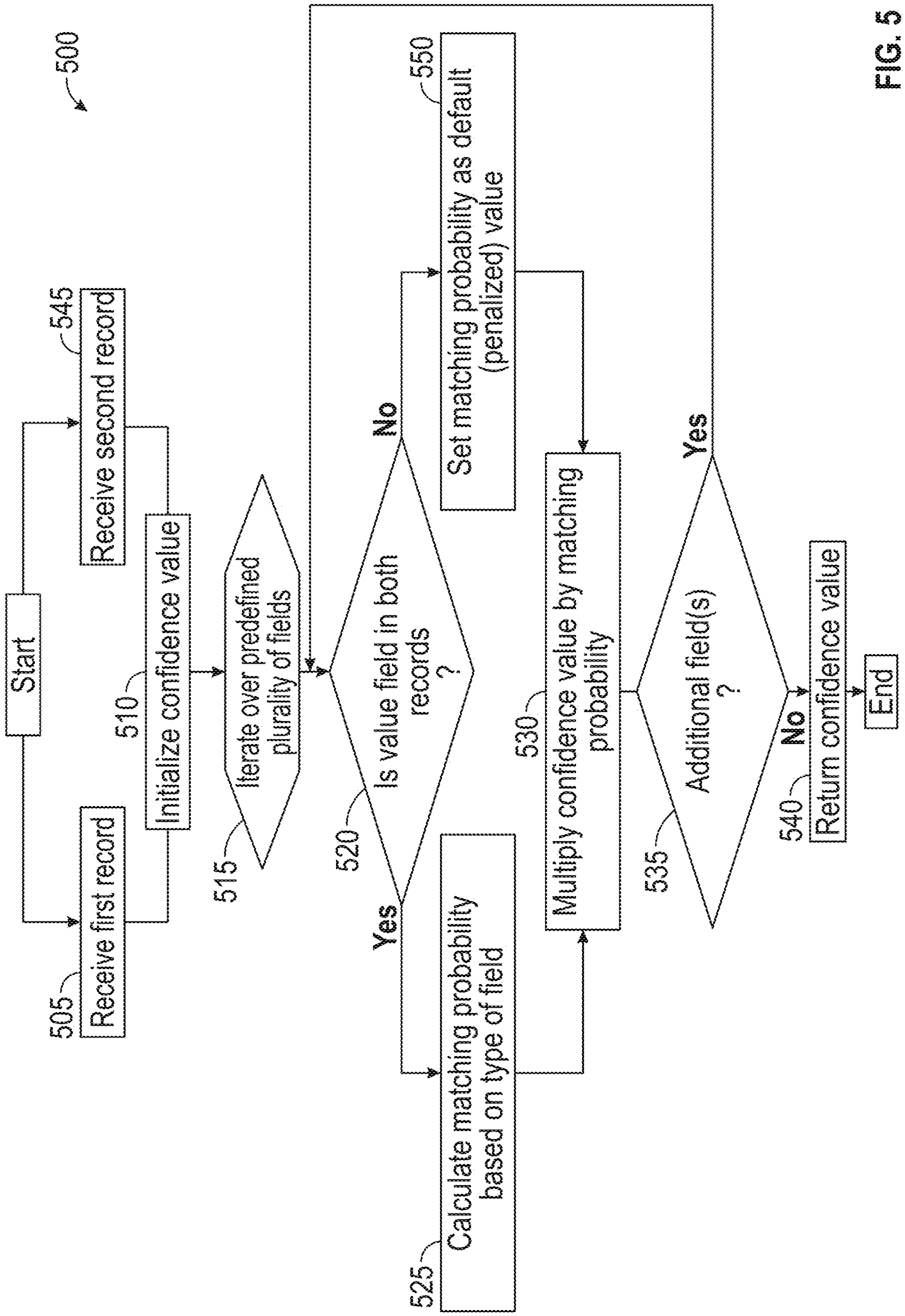
FIG. 5 is an exemplary method of calculating a confidence value for a pairing of a flight object with a global identifier record, according to one or more aspects.

FIG. 5 is an exemplary method 500 of calculating a confidence value for a pairing of a flight object with a global identifier record, according to one or more aspects. The method 500 may be used in conjunction with other aspects. For example, the method 500 may be performed by the air traffic management service 120 as part of block 430 and/or block 475 of FIG. 4.

The method 500 begins at blocks 505 and 545, which may occur overlapping or non-overlapping in time with each other. At block 505, the air traffic management service 120 receives a first record, and at block 545, the air traffic management service 120 receives a second record. In some aspects, the first record represents a flight object (e.g., received from a data source through a network), and the second record represents a global identifier record (e.g., retrieved from a global identifier database).

At block 510, the air traffic management service 120 initializes a confidence value to an initial value. The confidence value represents a confidence that the first record and the second record correspond to a same flight object. In some aspects, the range of the confidence value is the unit interval ([0,1]), and the initial value is set to 1 (a maximum confidence value). Other ranges of the confidence value, and the relative value of the initial value within the range, are also contemplated.

At block 515, the air traffic management service 120 iterates over a predefined plurality of fields. In some aspects, the predefined plurality of fields includes one or more alphanumeric fields and/or one or more temporal fields. In one example implementation, the predefined plurality of fields comprises a plurality of alphanumeric fields: an origin, a destination, and a callsign of the flight. In another example implementation, the predefined plurality of fields includes a plurality of alphanumeric fields: an origin, a destination, a callsign, an airline, a registration, an aircraft type, and a transponder address of the flight, and further includes one temporal field: an EOBT of the flight. Other implementations having different compositions of the predefined plurality of fields are also contemplated.

At block 520, the air traffic management service 120 determines whether the value for the field (i.e., a next field of the plurality of fields) is in both the first record and the second record. In some aspects, determining whether the value for the field is in both the first record and the second record comprises comparing, for the field, the corresponding values of the first set of values (of the first record) and of the second set of values (of the second record), and updating the confidence value based on the comparisons.

If a value for the field is present in the first record and the second record, and is the same value ("YES"), the method 500 proceeds to block 525. If a value is not present in both of the first record and second record ("NO"), the method 500 proceeds to block 550. The "NO" condition may occur when the first record and/or the second record are missing a value for the field, or when the first record and/or the second record do not include the field.

At block 550, the air traffic management service 120 sets a matching probability for the field as a default value. In some aspects, setting the matching probability comprises applying, for the field, a predefined penalty factor to the confidence value. In one non-limiting example, the penalty factor is 10%, corresponding to a matching probability of 90% (0.9) for the field. At block 530, the confidence value (initial value of 1) is multiplied by the matching probability for the field (here, 0.9) to update the confidence value to 1×0.9=0.9. At block 535, the air traffic management service 120 determines whether there are any additional fields of the plurality of fields. When there are additional fields remaining ("YES"), the method 500 returns to block 520 for the next field.

At block 525, the air traffic management service 120 calculates a matching probability for the field based on the type of the field. In some aspects, calculating the matching probability for the field comprises, when the field is an alphanumeric field, comparing the corresponding values of the first set and of the second set and determining a normalized Levenshtein distance of the corresponding values. Generally, the Levenshtein distance between two strings is the minimum number of single-character edits (insertions, deletions, or substitutions) needed to change one string into the other. Normalizing the Levenshtein distance allows the multiplicative product of the matching probability and confidence value (at block 530) to remain within the range of the confidence value. Other techniques for determining a similarity of the two values are also contemplated.

In some aspects, calculating the matching probability for the field comprises, when the field is a temporal field, comparing the corresponding values of the first set and of the second set comprises applying a step-wise function to determine a likelihood of the corresponding values being associated with a same event. In one non-limiting example, the field is an EOBT of the flight, and the step-wise function defines a matching probability of 1.0 for time differences of the EOBT of zero to 15 minutes, 0.95 for time differences of 16-30 minutes, 0.9 for time differences of 31-60 minutes, and 0.8 for time differences greater than 60 minutes. Other functions (e.g., a step-wise function with different step intervals, a continuous function, a function with one or more discontinuities, etc.) are also contemplated.

At block 530, the confidence value (initial value of 1) is multiplied by the matching probability for the field (determined at block 525) to update the confidence value. At block 535, the air traffic management service 120 determines whether there are any additional fields of the plurality of fields. When there are additional fields remaining ("YES"), the method 500 returns to block 520 for the next field.

When there are no additional fields remaining ("NO"), the method 500 proceeds from block 535 to block 540, where the air traffic management service 120 returns the calculated confidence value. The method 500 ends following completion of block 540.

Using a simplified example, the predefined plurality of fields comprises an origin, a destination, and a callsign of the flight (all alphanumeric fields). Assume that the matching probability is determined as 1.0 for the origin field, the matching probability is determined as 0.75 for the callsign field, and that one of the records omits a value for the destination field (such that the matching probability is determined as a penalized value of 0.9). The confidence value is thus calculated as 1.0 (initial value)×1.0 (origin field)×0.75 (callsign field)×0.9 (destination field)=0.675. Referring back to FIG. 4, and assuming a threshold value of 0.7, the confidence value of 0.675 indicates that the air traffic management service 120 will deem that the flight object does not match the global identifier record under consideration.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method comprising:

receiving, in real-time, through a network, from a first data source, information for a flight object comprising a first set of fields and corresponding values that describe information for a first aircraft flight;

in response to receiving a request from a client, retrieving one or more global identifier records from a global identifier database, each global identifier record comprising a unique global identifier for a respective aircraft flight and a respective second set of fields and corresponding values of the global identifier database that describe the respective aircraft flight;

calculating, based on a comparison of the first set of fields with some or all of the one or more respective second sets of fields, a respective confidence value for each pairing of the flight object with a respective one of the one or more global identifier records; and updating, when a calculated confidence value exceeds a threshold value, the global identifier record corresponding to the calculated confidence value using information from the first set of fields.

2. The computer-implemented method of claim 1, further comprising:

determining whether the information for the flight object was previously recorded in a first table of the global identifier database corresponding to the first data source; and when the information for the flight object was not previously recorded, recording the information for the flight object in the first table.

3. The computer-implemented method of claim 1, further comprising:

receiving, in real-time, through the network, from a second data source, information for a second flight object corresponding to the first aircraft flight;

recording information for the second flight object in a second table of the global identifier database corresponding to the second data source; and updating the global identifier record corresponding to the first aircraft flight using the information for the second flight object.

4. The computer-implemented method of claim 1, wherein calculating the respective confidence value for each pairing comprises:

initializing the confidence value to an initial value;

comparing, for each field of a predefined plurality of fields, the corresponding values of the first set of fields and of the respective second set of fields for each field of the predefined plurality of fields; and updating the confidence value based on the comparisons.

5. The computer-implemented method of claim 4, further comprising:

determining, for at least one field of the predefined plurality of fields, one or both of the first set of fields and the respective second set of fields do not include a value for the at least one field of the predefined plurality of fields; and applying, for the at least one field of the predefined plurality of fields, a predefined penalty factor to the confidence value.

6. The computer-implemented method of claim 4, wherein the predefined plurality of fields comprises one or more alphanumeric fields, and wherein comparing the corresponding values of the first set of fields and of the respective second set of fields comprises determining a normalized Levenshtein distance of the corresponding values.

7. The computer-implemented method of claim 4, wherein the predefined plurality of fields comprises one or more temporal fields, and wherein comparing the corresponding values of the first set of fields and of the respective second set of fields comprises applying a step-wise function to determine a likelihood of the corresponding values being associated with a same event.

8. A computer program product comprising:

a computer-readable storage medium having computer-readable program code embodied therewith, the computer-readable program code executable by one or more computer processors to perform an operation comprising:

receiving, in real-time, through a network, from a first data source, information for a flight object comprising a first set of fields and corresponding values that describe information for a first aircraft flight;

in response to receiving a request from a client, retrieving one or more global identifier records from a global identifier database, each global identifier record comprising a unique global identifier for a respective aircraft flight and a respective second set of fields and corresponding values of the global identifier database that describe the respective aircraft flight;

calculating, based on a comparison of the first set of fields with some or all of the one or more respective second sets of fields, a respective confidence value for each pairing of the flight object with a respective one of the one or more global identifier records; and updating, when a calculated confidence value exceeds a threshold value, the global identifier record corresponding to the calculated confidence value using information from the first set of fields.

9. The computer program product of claim 8, the operation further comprising:

determining whether the information for the flight object was previously recorded in a first table of the global identifier database corresponding to the first data source; and when the information for the flight object was not previously recorded, recording the information for the flight object in the first table.

10. The computer program product of claim 8, the operation, further comprising:

receiving, in real time, through the network, from a second data source, information for a second flight object corresponding to the first aircraft flight;

recording information for the second flight object in a second table of the global identifier database corresponding to the second data source; and updating the global identifier record corresponding to the first aircraft flight using the information for the second flight object.

11. The computer program product of claim 8, wherein calculating the respective confidence value for each pairing comprises:

initializing the confidence value to an initial value;

comparing, for each field of a predefined plurality of fields, the corresponding values of the first set of fields and of the respective second set of fields for each field of the predefined plurality of fields; and updating the confidence value based on the comparisons.

12. The computer program product of claim 11, the operation further comprising:

determining, for at least one field of the predefined plurality of fields, one or both of the first set of fields and the respective second set of fields do not include a value for the at least one field of the predefined plurality of fields; and applying, for the at least one field, a predefined penalty factor to the confidence value.

13. The computer program product of claim 11, wherein the predefined plurality of fields comprises one or more alphanumeric fields, and wherein comparing the corresponding values of the first set of fields and of the respective second set of fields comprises determining a normalized Levenshtein distance of the corresponding values.

14. The computer program product of claim 11, wherein the predefined plurality of fields comprises one or more temporal fields, and wherein comparing the corresponding values of the first set of fields and of the respective second set of fields comprises applying a step-wise function to determine a likelihood of the corresponding values being associated with a same event.

15. A system comprising:

one or more processors; and a memory storing instructions that when executed by the one or more processors enable performance of an operation comprising:

receiving, in real time, through a network, from a first data source, information for a flight object comprising a first set of fields and corresponding values that describe information for a first aircraft flight;

in response to receiving a request from a client, retrieving one or more global identifier records from a global identifier database, each global identifier record comprising a unique global identifier for a respective aircraft flight and a respective second set of fields and corresponding values of the global identifier database that describe the respective aircraft flight;

calculating, based on a comparison of the first set of fields with some or all of the one or more respective second sets of fields, a respective confidence value for each pairing of the flight object with a respective one of the one or more global identifier records; and updating, when a calculated confidence value exceeds a threshold value, the global identifier record corresponding to the calculated confidence value using information from the first set of fields.

16. The system of claim 15, the operation further comprising:

determining whether the information for the flight object was previously recorded in a first table of the global identifier database corresponding to the first data source; and when the information for the flight object was not previously recorded, recording the information for the flight object in the first table.

17. The system of claim 15, the operation further comprising:

receiving, in real-time, through the network, from a second data source, information for a second flight object corresponding to the first aircraft flight;

recording information for the second flight object in a second table of the global identifier database corresponding to the second data source; and updating the global identifier record corresponding to the first aircraft flight using the information for the second flight object.

18. The system of claim 15, wherein calculating the respective confidence value for each pairing comprises:

initializing the confidence value to an initial value;

comparing, for each field of a predefined plurality of fields, the corresponding values of the first set of fields and of the respective second set of fields for each field of the predefined plurality of fields; and updating the confidence value based on the comparisons.

19. The system of claim 18, the operation further comprising:

determining, for at least one field of the predefined plurality of fields, one or both of the first set of fields and the respective second set of fields do not include a value for the at least one field of the predefined plurality of fields; and applying, for the at least one field of the predefined plurality of fields, a predefined penalty factor to the confidence value.

20. The system of claim 18, wherein the predefined plurality of fields comprises one or more alphanumeric fields and one or more temporal fields, wherein comparing the corresponding values of the first set of fields and of the respective second set of fields comprises determining a normalized Levenshtein distance of the corresponding values for the one or more alphanumeric fields, and wherein comparing the corresponding values of the first set of fields and of the respective second set of fields comprises applying a step-wise function to determining a likelihood of the corresponding values being associated with a same event for the one or more temporal fields.

* * * * *